(12) United States Patent
Watanabe et al.

(10) Patent No.: US 6,337,112 B1
(45) Date of Patent: Jan. 8, 2002

(54) ENDLESS BELT FOR DEWATERING PRESS

(75) Inventors: Atsuo Watanabe, Osaka; Kenjiro Nakayama; Takahisa Hikida, both of Kyoto, all of (JP)

(73) Assignee: Yamauchi Corporation, Osaka (JP)

( * ) Notice: Subject to any disclaimer, the term of this patent is extended or adjusted under 35 U.S.C. 154(b) by 0 days.

(21) Appl. No.: 08/221,467

(22) Filed: Apr. 1, 1994

Related U.S. Application Data

(63) Continuation of application No. 07/868,681, filed on Apr. 15, 1992, now abandoned.

(30) Foreign Application Priority Data

Apr. 15, 1991 (JP) .............................. 3-082653

(51) Int. Cl.$^7$ .............................. B29D 23/24
(52) U.S. Cl. ................... 428/34.7; 428/34.4; 428/34.5; 428/34.6; 428/35.2; 428/35.3; 428/35.7; 428/35.8; 428/36.3; 428/36.4; 428/36.8; 428/36.92; 428/247; 428/289; 428/285; 428/286; 428/287; 428/290; 428/109; 428/114; 428/35.9; 162/358.1; 162/358.2; 162/358.3; 162/358.4; 162/358.5
(58) Field of Search .............................. 428/34.4, 34.5, 428/34.6, 34.7, 35.2, 35.3, 35.7, 35.8, 35.9, 36.4, 36.3, 36.8, 36.9, 36.92, 285, 286, 287, 289, 290, 247, 109, 114; 162/328.1, 358.2, 358.3, 358.4, 358.5

(56) References Cited

U.S. PATENT DOCUMENTS

| | | | |
|---|---|---|---|
| 4,229,254 A | * 10/1980 | Gill | 162/358.4 |
| 4,287,021 A | * 9/1981 | Justus et al. | 162/358.3 |
| 4,431,045 A | * 2/1984 | Josefsson | 162/358.3 |
| 4,559,258 A | 12/1985 | Kiuchi | 428/156 |
| 4,662,992 A | * 5/1987 | Mirsberger | 162/203 |
| 4,668,540 A | 5/1987 | Long et al. | 427/369 |
| 4,701,368 A | * 10/1987 | Kiuchi et al. | 428/233 |
| 4,874,469 A | * 10/1989 | Pulkowski et al. | 162/358.5 |
| 4,908,103 A | 3/1990 | Cronin et al. | 162/358.4 |
| 4,944,820 A | 7/1990 | McCarten | 156/154 |
| 4,946,731 A | 8/1990 | Dutt | 428/156 |
| 5,062,924 A | 11/1991 | McCarten et al. | 162/358.4 |
| 5,171,389 A | * 12/1992 | Stigberg | 156/165 |

FOREIGN PATENT DOCUMENTS

| | | |
|---|---|---|
| EP | 0194602 | 3/1986 |
| EP | 0336876 | 10/1989 |
| EP | 0336876 | * 11/1989 |
| GB | 2106555 | 8/1982 |
| GB | 2106557 | 5/1984 |

* cited by examiner

*Primary Examiner*—S. Mark Clardy
*Assistant Examiner*—Michael A. Williamson
(74) *Attorney, Agent, or Firm*—Birch, Stewart, Kolasch & Birch, LLP

(57) ABSTRACT

An endless belt in which a fibrous material is dispersed in a substantially uniform manner all over an endless elastic body layer is provided. A non-woven tape is impregnated with a polyurethane elastomer material liquid and wound and layered on a supporting belt, and then, after curing the polyurethane elastomer material liquid to form an elastic body, it is removed from supporting belt.

29 Claims, 14 Drawing Sheets

ENDLESS BELT FOR DEWATERING PRESS

This application is a continuation of application Ser. No. 07/868,681 filed on Apr. 15, 1992 now abandoned.

BACKGROUND OF THE INVENTION

1. Field of the Invention

The present invention relates to an endless belt which can be used in a press apparatus such as an Extended Nip Press or Intensa S Press or the like for dewatering a wet web of paper in a paper making process.

2. Description of the Background Art

Recently, a so-called shoe press wherein, in the press part of a paper making process, dewatering of a web is carried out by pressing one surface of a web placed on a felt for enhancing the effect of dewatering the web with a rotary roll and pressurizing the other surface through an endless belt with a pressure shoe is becoming popular.

FIGS. 12 is a typical cross sectional view illustrating an Extended Nip Press as an example of such a press. Referring to FIG. 12, a pressure shoe 41 is arranged under a rotary roll 40. An endless belt 42 as a dewatering press is provided between rotary roll 80 and pressure shoe 41. Endless belt 42 is mounted and wound around guide rolls 43a and 43b and tension rolls 44a, 44b and 44c. A web 45 and felt 46 are passed between the endless belt 42 and the rotary roll 40.

If the rotary roll 40 is rotated in a direction indicated by arrow A, web 45 placed on felt 46 and endless belt 42 are moved in directions indicated by arrow B and arrow C, respectively. Web 45 and felt 46 are pressed strongly toward the rotary roll 40 by the pressure shoe 41 in the range of the pressure dewatering part P. Accordingly, web 45 is dewatered in pressure dewatering part P.

FIG. 13 is a typical cross sectional view illustrating an Intensa S Press as another example. Referring to FIG. 13, a cylindrical endless belt 52 for a dewatering press is provided under a rotary roll 50. A pressure shoe 51 pressing toward the rotary roll 50 through endless belt 52 is provided inside the endless belt 52. A web 54 and a felt 53 are passed between endless belt 52 and rotary roll 50. A pressure dewatering part P having a large width is formed between rotary roll 50 and pressure shoe 51. Web 54 is dewatered in pressure dewatering part P.

The following are endless belts for dewatering presses conventionally proposed for such shoe presses.

(1) a belt in which a synthetic resin such as polyurethane resin or rubber is impregnated into a base fabric of an endless belt from one of its surfaces (hereinafter referred to as a single coat type belt; U.K. Patent No. 2,106,555, U.K. Patent No. 2,106,557 and so forth)

(2) a belt in which an endless base fabric is embedded in a layer of synthetic resin or rubber (hereinafter referred to as a base fabric embedded belt: European Patent No. 194,602 and so forth)

(3) a belt in which a synthetic resin such as polyurethane resin or rubber is impregnated into an endless base fabric from both of its front and rear surfaces, and grooves are formed on the surface (hereinafter referred to as a double coat type grooved belt: U.S. Pat. Nos. 4,559,258, 4,908,103, 4,946,731 and so forth)

However, the above-described conventional endless belts for dewatering presses have problems as follows.

(a) Since all of the single coat type belt, the base fabric embedded belt, and the double coat type grooved belt use an endless base fabric impregnated with a synthetic resin or a rubber, the strength of the bond between the base fabric and the synthetic resin or rubber is small in such belts.

Particularly, in the case where layers disposed on both of the front and rear surfaces of the double coat type grooved belt are formed by the casting method, synthetic resin or rubber penetrates the base fabric from only one of the surfaces. Accordingly, it is not possible to cause the synthetic resin or rubber to penetrate the base fabric when the opposite surface is formed, so that a uniform anchoring effect from both sides cannot be obtained, and thus it is not possible to obtain a strong bond between the respective components. Therefore, there is the problem that, as the belt is used, a breaking away phenomenon is caused between the base fabric and the synthetic resin or the rubber which greatly reduces the life of the belt.

(b) An endless base fabric is normally formed of monofilaments such as polyamide fiber, polyester fiber, or the like. Such fiber is generally a material having hardness higher than the hardness of the synthetic resin or rubber. Therefore, when the endless base fabric is bent during the conveying of the belt, the endless base fabric tends to be subject to a concentration of stress, and a breaking away phenomenon tends to occur between the base fabric and the synthetic resin or the rubber. The life of the conventional belt is also made relatively short for this reason.

(c) Since the double coat type grooved belt is provided with grooves on its surface, moisture generated by dewatering of a web is held in the grooves. Therefore, the double coat type grooved belt has superior dewatering efficiency as compared with the single coat type belt. However, the double coat type grooved belt is formed on both its front and rear surfaces by the casting method or the like using a synthetic resin or a rubber. When one surface is formed after formation of the other surface, the texture of the base fabric is already tight, so that bubbles in the coating material do not disappear easily, and the belt is formed with the bubbles remaining. Accordingly, in the case of the double coat type grooved belt, such bubbles tend to be left in the resin or the rubber. If such a belt is used, white water which is pressurization during pressurizing of a rotary roll permeates from the bottom part of the grooves into the bubbles and further permeates from the bubbles into the base fabric. As a result, the breaking away phenomenon between the base fabric and a coating layer occurs at a relatively early time which shorten the life of the belt.

(d) In addition, the conventional endless belts use endless base fabric. The tensile force of filaments in endless base fabric is often not uniform, and it often happens that the base fabric is distorted in the belt during a manufacturing process thereof. Therefore, the entire belt tends to receive the distortion and is correspondingly deformed, or wrinkles or the like tend to be generated.

SUMMARY OF THE INVENTION

An object of the present invention is to solve such conventional problems and provide an enduring endless belt for a dewatering press in which no breakdown such as the breaking away phenomenon occurs and which can be used stably for a long time.

An endless belt according to the present invention is characterized in that a fibrous me is dispersed in a substantially uniform manner throughout a cylindrical endless elastic body layer.

According to the present invention, a cylindrical endless elastic body layer can be formed by impregnating a liquid elastic body precursor into a fibrous material and curing the liquid elastic body precursor.

Non-woven fabric may be used, for example, as the fibrous material to be impregnated with the liquid elastic body precursor. Non-woven fabric is natural fiber, chemical fiber, glass fiber, metallic fiber, or the like coupled by a chemical or physical method. Such non-woven fabric includes stitch bond non-woven fabric, needle punched non-woven fabric, spun bond non-woven fabric, melt blown non-woven fabric, spun lace non-woven fabric, wet laid process non-woven fabric, chemical bond type dry laid process non-woven fabric, thermal bond type dry laid process non-woven fabric, or air laid type dry laid process non-woven fabric and wet laid process non-woven fabric, or the like.

An organic fiber and/or an inorganic fiber is used as the material for a non-woven tape. Polyamide fiber, aromatic polyamide fiber, polyester fiber, polyacrylonitrile fiber, polyvinyl alcohol fiber, polyethylene fiber, polypropylene fiber, polyurethane fiber, polyvinyl chloride fiber, polystyrene fiber, polyfluoroethylene fiber, regenerated cellulose fiber, cotton fiber, or the like is used as the organic fiber.

Glass fiber, metallic fiber, rock fiber, or the like is used as the inorganic fiber. In addition, the non-woven tape may be formed of a mixed fiber, of an organic fiber and a inorganic fiber.

According to the present invention, polyurethane elastomer, acrylonitrile-butadiene copolymer, epichlorohydrin rubber, liquid rubber such as liquid polyurethane rubber, liquid nitrile rubber, liquid chloroprene rubber, liquid styrene rubber, liquid butadiene rubber, or the like, thermoplastic elastomer of polyurethane type, polyester type, polyolefin type, or the like, latex such as styrene-butadiene rubber latex, butyl rubber latex, polyurethane rubber latex or the like, or an emulsion such as polyurethane rubber emulsion, styrene rubber emulsion, nitrile rubber emulsion, or the like may be used as an elastic body or an elastic body precursor used in an elastic body layer.

The thermoplastic elastomer is made liquid by diluting it with a solvent for use and removing the solvent with heat or the like in the manufacturing process. According to the present invention, the liquid elastic body precursor includes such a thermoplastic elastomer diluted with solvent.

In cases where latex and emulsion are used, a dispersion medium is also removed with heat or the like during the manufacturing process of the belt.

In accordance with a preferred mode of carrying out the present invention, a non-woven tape impregnated with a liquid elastic body precursor is wound and layered in a cylindrical manner and integrated by curing the impregnated elastic body precursor.

In addition, according to the present invention, it is also possible to form a plurality of grooves on an outer peripheral surface of an elastic body layer in a circumferential direction. The grooves may be of a helical shape, a knurled shape, a diagonal lattice-like shape, or the like. It is possible to enhance the dewatering efficiency by forming such grooves as in the case of the conventional double coat type grooved belt.

According to the present invention, the mechanical strength can be reinforced by arranging reinforcing yarn-like bodies in an elastic body layer. The reinforcing yarn-like bodies are preferably arranged along a circumferential direction. In a case where grooves are formed on the outer peripheral surface or the like, the reinforcing yarn-like bodies are preferably arranged inside in the radial direction in the elastic body layer.

According to the present invention, an organic material and/or an inorganic material can be used as the reinforcing yarn-like bodies. Polyamide fiber, aromatic polyamide fiber, polyester fiber, or the like can be used as the organic material. Its shape may be of a bundle of filaments, yarn, roving, a cord, or the like. Glass fiber, metallic fiber, or the like may be used as the inorganic material. Its shape may be of roving, a cord, a wire, or the like.

According to the present invention, the mechanical strength in the circumferential direction and the width direction can be reinforced by arranging a reinforcing net-like material body in an elastic body layer.

According to the present invention, an organic material and/or an inorganic material can be used as the reinforcing net-like material body. Polyamide fiber, polyester fiber, polyvinyl alcohol fiber, or the like can be used as the organic material. Carbon fiber, metallic fiber, glass fiber, or the like can be used as the in organic material. Its shape may be of yarn, a cord, a wire, or the like. The meshes of the reinforcing net-like material body may be lattice-like shaped, lozenge-shaped, for example.

In addition, according to the present invention, the hardness of an elastic body layer in a part outside in the radial direction may be different from the hardness of the elastic body layer in a part inside in the radial direction. For example, it is possible to make the hardness in a part outside in the radial direction higher than the hardness in a part inside in the radial direction.

A manufacturing method according to the present invention includes the step of impregnating a liquid elastic body precursor into a tape-like fibrous material, winding and layering the tape-like fibrous material impregnated with the elastic body precursor on a supporter having an endless peripheral surface, the step of curing the elastic body precursor impregnated in the layered tape-like fibrous material to form an elastic body layer, and the step of removing the elastic body layer from the supporter.

In a case where an endless belt which is long in a circumferential direction such as an endless belt for Extended Nip Press or the like is manufactured, a supporter wherein a supporting belt is provided between a pair of rolls may be used.

In a case where an endless belt which is of a cylindrical shape as a whole and not so long in a circumferential direction such as Intensa S Press or the like is manufactured, a roll may be used as a supporter.

According to a manufacturing method in accordance with the present invention, a tape-like fibrous material impregnated with a liquid elastic body precursor is preferably wound on a supporter in a helical manner. It is possible to shift the tape-like fibrous material with a constant pitch while layering it to obtain an endless belt having a constant thickness with a desirable width.

In a case where an outer peripheral surface of an elastic body layer is cut and ground, it is preferable that the elastic body layer is worked before removed from a supporter. That is, it is preferable that the elastic body layer is cut and ground with the elastic body layer being wound on the supporter.

In addition, in a case where grooves are formed on the outer peripheral surface along a circumferential direction, it is also convenient to work an elastic body layer wound on a supporter.

In order to make it easy to remove an elastic body layer from a supporter, it is preferable that a mold release agent is applied on an endless peripheral surface of the supporter.

In a case where an endless belt in which reinforcing yarn-like bodies are arranged in an elastic body layer is manufactured, it is possible to arrange the reinforcing yarn-like bodies on a tape-like fibrous material to wind the reinforcing yarn-like bodies together with the tape-like fibrous material while winding the tape-like fibrous material on a supporter. In this case, it is possible to set the positions of the reinforcing yarn-like bodies in the elastic body layer of the belt in accordance with the positions of the reinforcing yarn-like bodies on the tape-like fibrous material. For example, it is possible to adjust the positions of the reinforcing yarn-like bodies so that the reinforcing yarn-like bodies are arranged more close to the side of the supporter of the elastic body layer, i.e., inside in the radial direction.

In addition, it is also possible to adjust the degree of reinforcement achieved by reinforcing yarn-like bodies by adjusting the number of the yarn-like bodies during winding of the reinforcing yarn-like bodies together with a tape-like fibrous material.

In a case where an endless belt in which reinforcing net-like material body is arranged in an elastic body layer is manufactured, it is possible to arrange the reinforcing net-like material body on a tape-like fibrous material to wind the reinforcing net-like material body together with the tape-like fibrous material while winding the tape-like fibrous material on a supporter. It is also possible to wind the above tape-like fibrous material on a supporter, then wind reinforcing net-like material body on the fibrous material, and further wind a tape-like fibrous material thereon.

According to a manufacturing method in accordance with the present invention, a tape-like fibrous material impregnated with a liquid elastic body precursor is wound on a supporter with a predetermined tensile force. The tensile force of winding may be selected suitably. For example, in a case where a non-woven tape having a width of 165 mm is used as the tape-like fibrous material, the tensile force of the winding is generally in the range of 5 kg to 10 kg. The thickness of a belt manufactured by this manufacturing method can be adjusted in various ways. For example, in a case where it is wound on a supporter in a helical manner, it is possible to adjust the thickness of a belt by changing the pitch with which the tape-like fibrous material is shifted. In such a case, generally, it is possible to increase the thickness of the belt by making the pitch smaller, and to reduce the thickness of the belt by making the pitch larger.

In addition, after a tape-like fibrous material is once wound on a supporter, it is possible to further wind a tape-like fibrous material thereon. In this case, it is possible to use a different type of tape-like fibrous material or elastic body precursor to be impregnated. It is also possible to manufacture a belt in which the hardness in the inside part of the belt and the hardness in the outside part of the belt are different by using different types of elastic body precursor or the like, for example, using elastic bodies having different molecular weights in the inside and outside parts of the belt.

According to the present invention, curing of an elastic body precursor can be performed by heating or leaving at room temperature, for example.

It is apparent that working of an endless belt may be performed after it is removed from a supporter. For example, it is possible to cut and grind an outer peripheral surface of the belt after it is removed from the supporter. An inner peripheral surface of the belt may be also cut and ground if necessary.

In an endless belt for a dewatering press in accordance with the present invention, a fibrous material is dispersed in a substantially uniform manner all over an elastic body layer. Therefore, the whole belt is unified, and, unlike the conventional belt, different materials or materials having different strength are not bonded, so that the belt itself is not broken away.

In addition, the whole is uniform, so that stress is also applied uniformly to the whole of it, and it does not happen that large distortion is received inside the belt.

Endless base fabric in which the tensile force of filaments tend to be not uniform is not used, so that the belt is not distorted as in the conventional case.

According a manufacturing process of the present invention, a tape-like fibrous material impregnated with a liquid elastic body precursor is wound and layered on a supporter, and the elastic body precursor is cured to form an elastic body layer. The tape-like fibrous material impregnated with the liquid elastic body precursor is layered and bonded by the liquid elastic body precursor to be integrated. Therefore, the tape-like fibrous material cured after layered is in the state wherein the fibrous material is uniformly dispersed and contained in the elastic body layer.

According to this manufacturing method, it is possible to obtain an endless belt of desired shape and structure freely by changing the shape and size of a supporter or by changing the width of the tape-like fibrous material or the number of layers to be layered. Accordingly, it is possible to manufacture an endless belt adapted to wider application as compared with the conventional endless belt using endless base fabric.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiment 1

Figure 1:
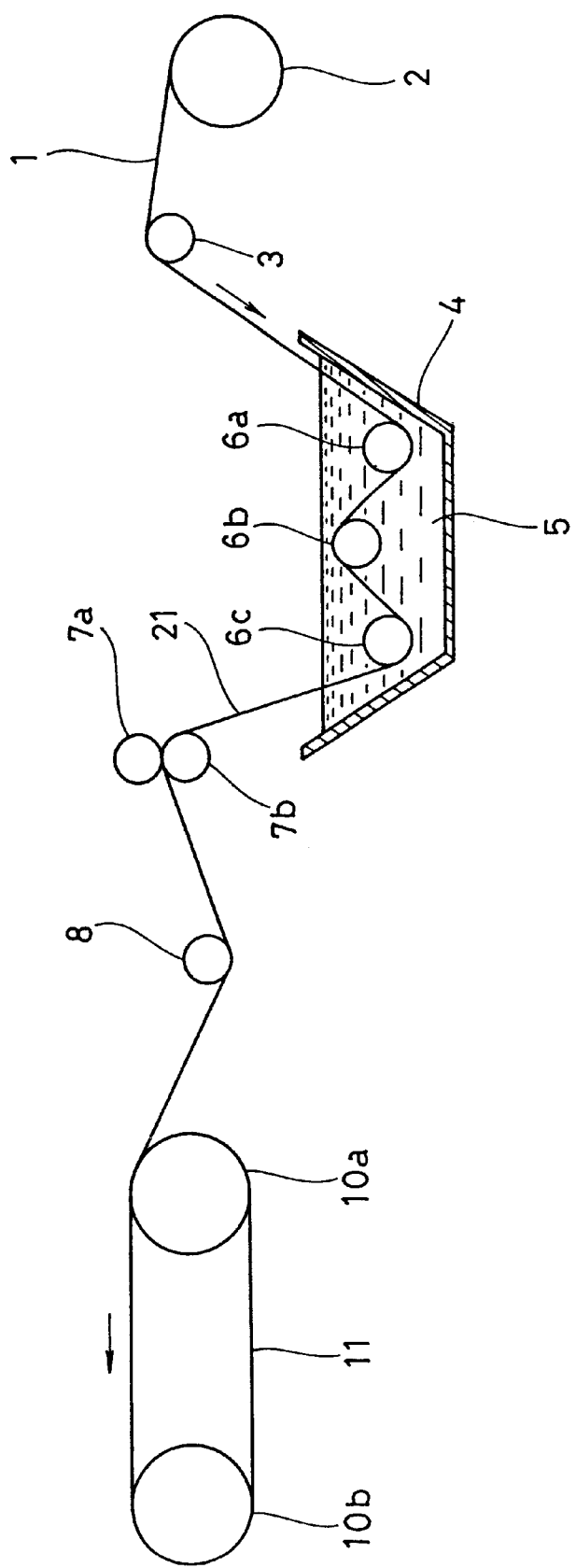
FIG. 1 is a typical view illustrating a manufacturing apparatus according to a first embodiment of the present invention.

FIG. 1 is a typical view illustrating a manufacturing apparatus according to a first embodiment of the present invention. Referring to FIG. 1, a non-woven tape 1 is wound on a feed roll 2, and feed roll 2 is rotated to supply non-woven tape 1. Non-woven tape 1 passes a guide roller 3 and is dipped in polyurethane elastomer material liquid 5 in a tank 4. Three dipping rollers 6a, 6b and 6c are provided in tank 4. The non-woven tape 1 is passed between dipping rollers 6a, 6b and 6c and through the a polyurethane elastomer material liquid 5 to be impregnated. Non-woven tape 21 impregnated with the polyurethane elastomer material liquid is then passed between squeezing rolls 7a and 7b. It is possible to adjust the amount of the impregnated liquid in the impregnated non-woven tape 21 by adjusting the gap between squeezing rolls 7a and 7b. In addition, it is also possible to adjust the thickness of impregnated non-woven tape 21. The impregnated non-woven tape 21 is then passed through an outer peripheral surface of a tension roll 8 and supplied onto a supporting belt 11 mounted on outer the peripheral surfaces of metallic rolls 10a and 10b. Supporting belt 11 according to this embodiment is made of rubber, and a mold release agent is applied on its surface. Metallic rolls 10a and 10b can be formed of iron, stainless steel, or the like.

Figure 2:
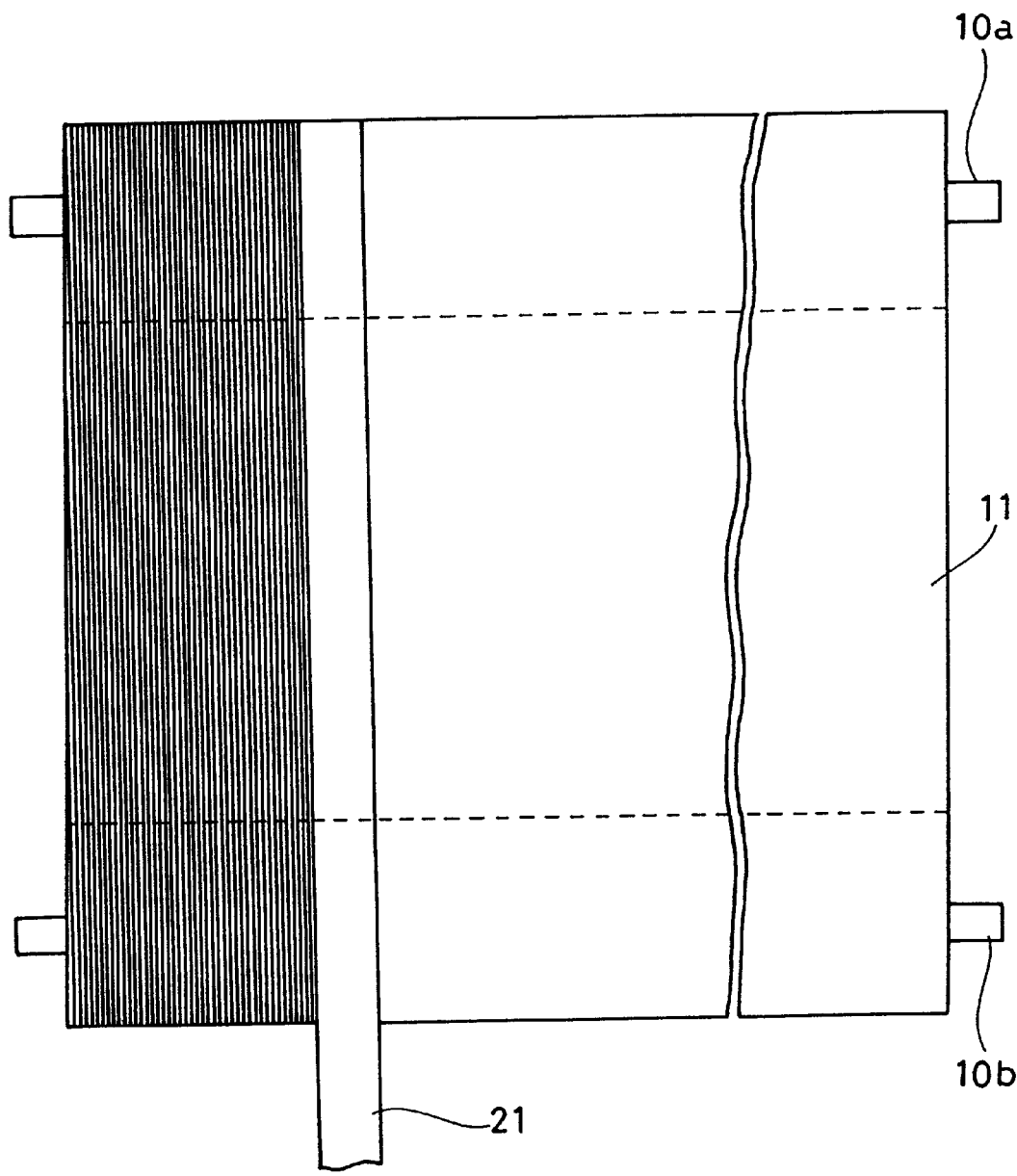
FIG. 2 is a plan view illustrating a state of winding of a non-woven tape on a supporter according to the embodiment illustrated in FIG. 1.

FIG. 2 is a plan view showing a state of winding of a non-woven tape on a supporter in the embodiment shown in FIG. 1. Referring to FIG. 2, impregnated non-woven tape 21 is wound from one end of supporter 11, shifted with a predetermined pitch. The state shown in FIG. 2 is an intermediate state, and impregnated non-woven tape 21 is wound until it reaches the other end of supporter 11 with impregnated non-woven tape 21 shifted in a transverse direction with a predetermined feed pitch.

According to this embodiment, stitch bond non-woven fabric having a width of 165 mm is used as the non-woven tape. A non-woven tape (Bonyarn C-3512TA3: Nippon Non-woven Fabric Company, Ltd.) in which the web is made of polyester fiber, the inlaid yarn is made of polyamide fiber, and a basis weight is 115 $g/m^2$ is used.

Hiprene—L100 (Trademark: Mitsui Toatsu Chemicals, Inc.) containing 100 weight parts of a polyurethane prepolymer mixed with 4, 4' methylenebisorthochloroaniline a 12.5 weight parts of a curing agent is used as the polyurethane elastomer for impregnation.

In the winding of the impregnated non-woven tape to the supporter, the feed pitch is 20 mm, and the tensile force of winding is 10 kg. After the winding of the non-woven tape, the polyurethane elastomer is cured, then its surface is cut and ground, and then removed from the supporter. The thickness of the thus manufactured endless belt is about 2.6 mm, which is the same as the thickness of the conventional single coat. Its inner circumferential length is 7.62 m, and its width is 4.76 m.

Figure 3:
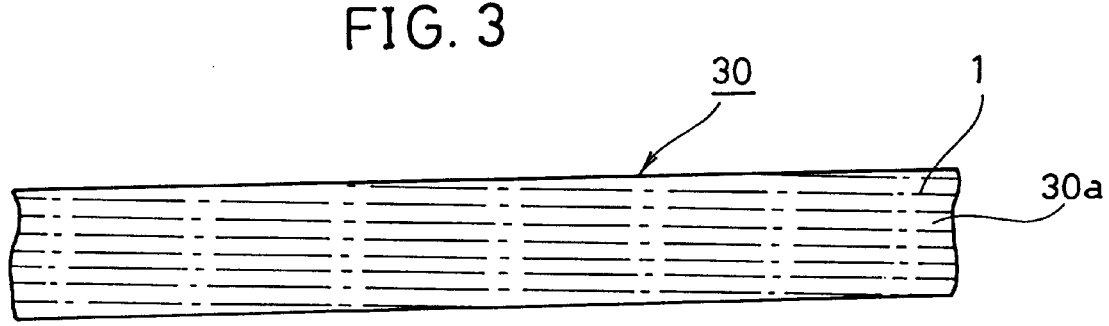
FIG. 3 is a cross sectional view illustrating a belt according to the first embodiment of the present invention.

FIG. 3 is a cross sectional view showing a belt obtained in accordance with this embodiment. Although the one-dotted chain line in endless belt 30 shown in FIG. 3 shows a layer of a non-woven tape 1, such a boundary surface is not recognized in the final endless belt, and a fibrous material constituting the non-woven tape is contained and dispersed uniformly in the polyurethane elastomer 30a.

Embodiment 2

Figure 4:
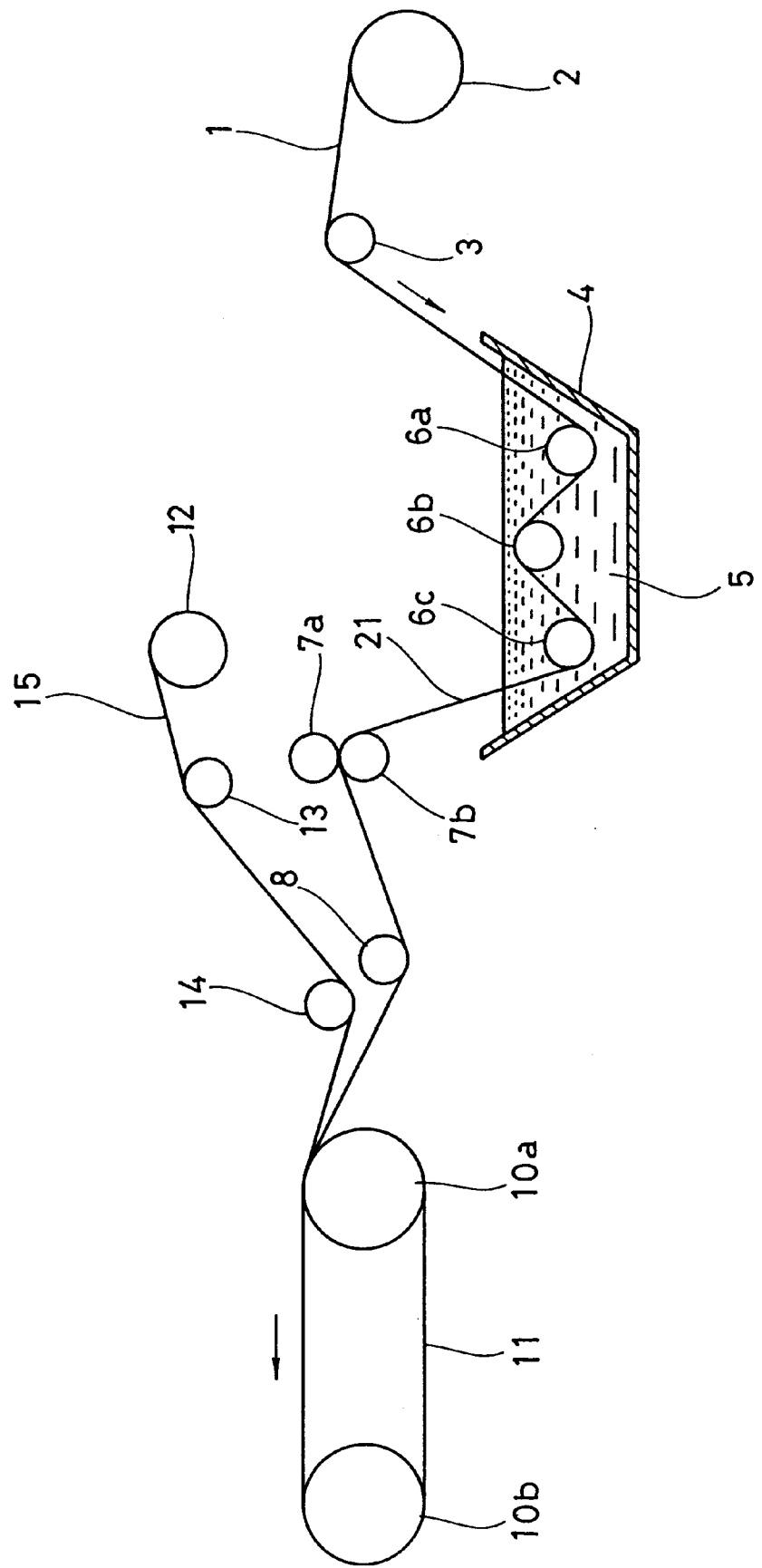
FIG. 4 is a typical view illustrating a manufacturing apparatus according to a second embodiment of the present invention.

FIG. 4 is a typical view illustrating a manufacturing apparatus according to a second embodiment of the present invention. Referring to FIG. 4, according to this embodiment, aromatic polyamide fiber 15 is placed on an impregnated non-woven tape 21 when impregnated non-woven tape 21 impregnated with a polyurethane elastomer material liquid 5 is wound on a supporting belt 11. Aromatic polyamide fiber 15 as reinforcing yarn is wound on a feed roll 12 and supplied by rotating feed roll 12. Aromatic polyamide fiber 15 fed from feed roll 12 is passed through an outer peripheral surface of a guide roll 13, passed through an outer peripheral surface of a tension roll 14, and arranged on non-woven tape 21.

Figure 5:
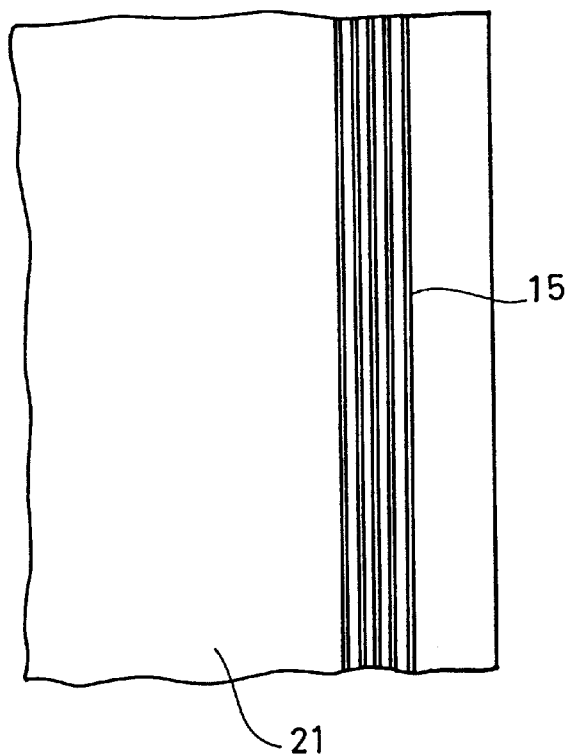
FIG. 5 is a plan view illustrating a state of arrangement of reinforcing yarn on a non-woven tape according to the embodiment illustrated in FIG. 4.

FIG. 5 is a plan view showing the state of arrangement of the reinforcing yarn on the non-woven tape in the embodiment shown in FIG. 4. As shown in FIG. 5, five pieces of reinforcing yarn 15 are arranged parallel with each other with a pitch of about 2 mm in a part of about 10 mm from the end of impregnated non-woven tape 21.

The same non-woven tape and a polyurethane elastomer as in the case of Embodiment 1 are used. Accordingly, five pieces of reinforcing yarn are arranged in the end part of 10 mm in the width of 165 mm of the non-woven tape.

A bundle of filaments of aromatic polyamide fiber, Kevlar (Trademark: Du Pont Toray Kevlar, Ltd.), is used as the reinforcing yarn.

The reinforcing yarn is wound on supporting belt 11 with the same tensile force as that of the non-woven tape.

The reinforcing yarn may be also passed through a specially provided polyurethane material liquid, impregnated, and then supplied to supporting belt 11.

The feed pitch of impregnated non-woven tape 21 and reinforcing yarn 15 is 10 mm, which is about a half of that in Embodiment 1.

Figure 6:
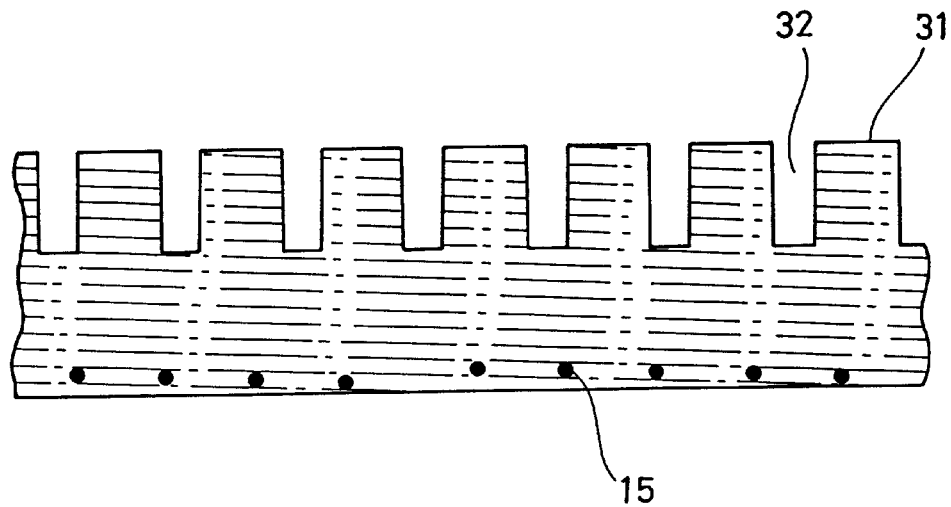
FIG. 6 is a cross sectional view illustrating a belt according to a second embodiment of the present invention.

After winding impregnated non-woven tape and reinforcing yarn 15 on the whole of supporting belt 11, the polyurethane elastomer is cured, and its surface is cut and ground. Then, according to this embodiment, grooves along a circumferential direction (i.e., machine direction) are formed on its surface using a rotary cutter. The thickness of the obtained endless belt is about 5.5 mm, and its section is as shown in FIG. 6. Referring to FIG. 6, grooves 32 along a circumferential direction are formed on an outer peripheral surface of endless belt 31 according to this embodiment. Reinforcing yarn 15 is arranged inside an elastic body layer layer adjacent to the inner edge of the belt as shown in FIG. 6. Although the one-dotted chain line in FIG. 6 also shows the boundary of the non-woven tape, it is not recognized in the final endless belt.

Embodiment 3

Figure 7:
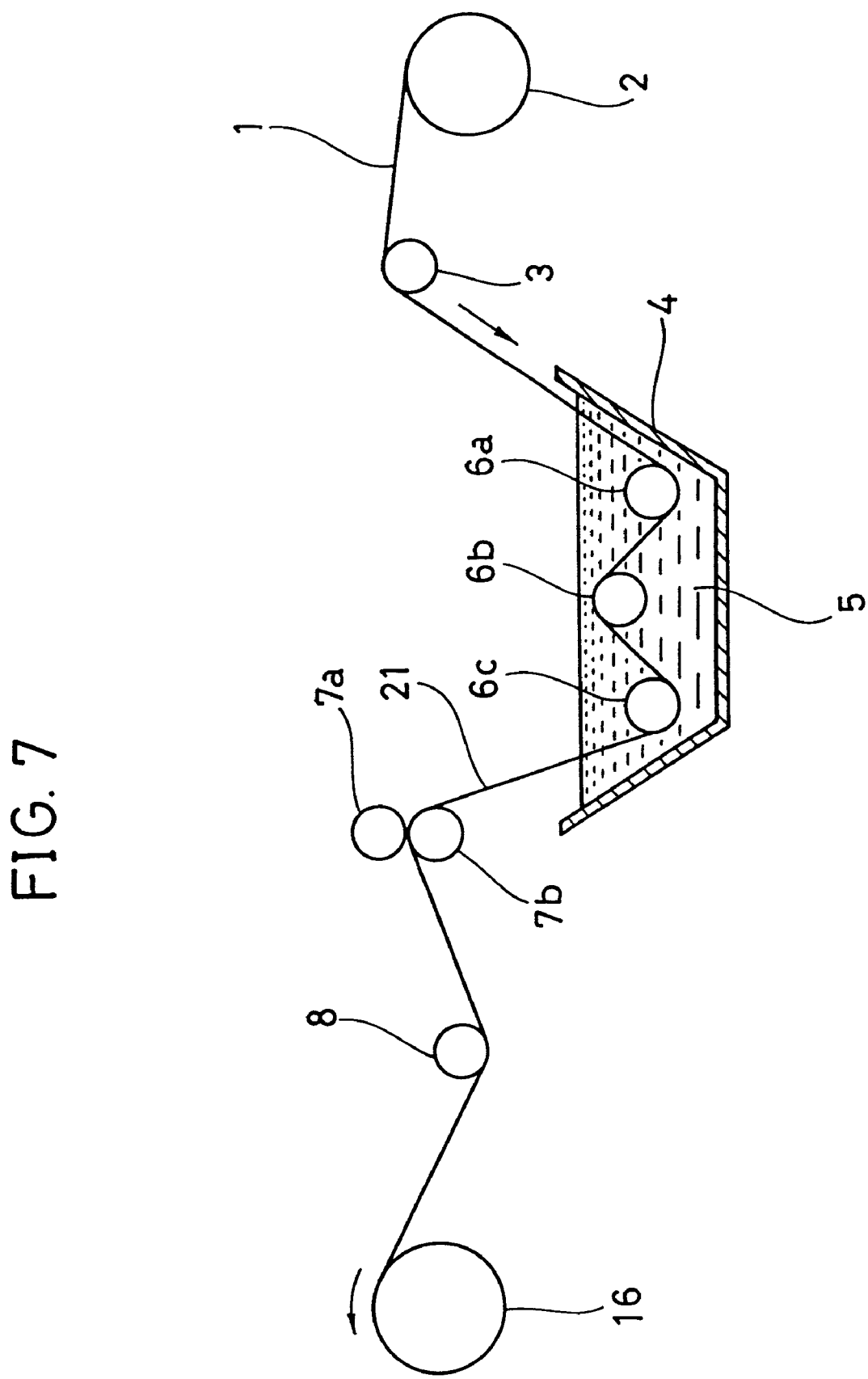
FIG. 7 is a typical view illustrating a manufacturing apparatus according to a third embodiment of the present invention.

FIG. 7 is a typical view illustrating a manufacturing apparatus according to a third embodiment of the present invention. Referring to FIG. 7, a metallic roll 16 is used as a supporter on which an impregnated non-woven tape 21 is wound in this embodiment.

Needle punched non-woven fabric having a width of 165 mm is used as the non-woven tape. A non-woven tape (Kurelock NXF-045K: Kureha Ltd.) in which the web is of aromatic polyamide fiber and a basis weight is 450 g/m$^2$ is used.

A polyurethane elastomer liquid which is the same as the one in the case of Embodiment 1 is used.

According to this embodiment, impregnated non-woven tape 21 is wound on metallic roll 16 as a supporter with a feed pitch of 10 mm without utilizing a reinforcing yarn.

After curing, the surface of the belt is cut and ground, and grooves are formed with a rotary cutter in this embodiment as in the case of Embodiment 2.

Figure 8:
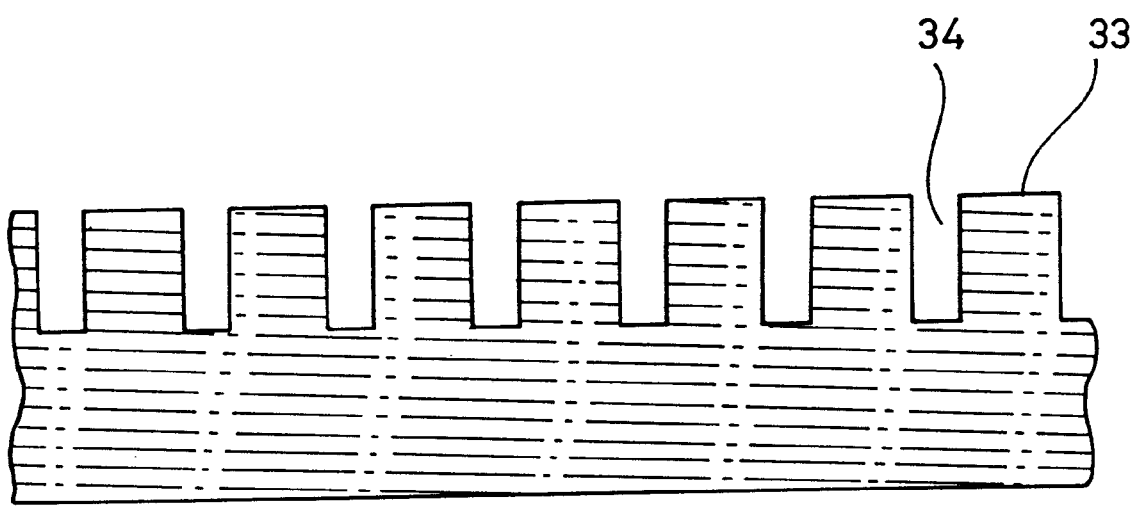
FIG. 8 is a cross sectional view illustrating a belt according to the third embodiment of the present invention.

FIG. 8 is a cross sectional view of thus obtained endless belt. Grooves 34 along a circumferential direction are formed on an outer peripheral surface of an endless belt 33. Its thickness is about 5.5 mm.

Embodiment 4

Figure 9:
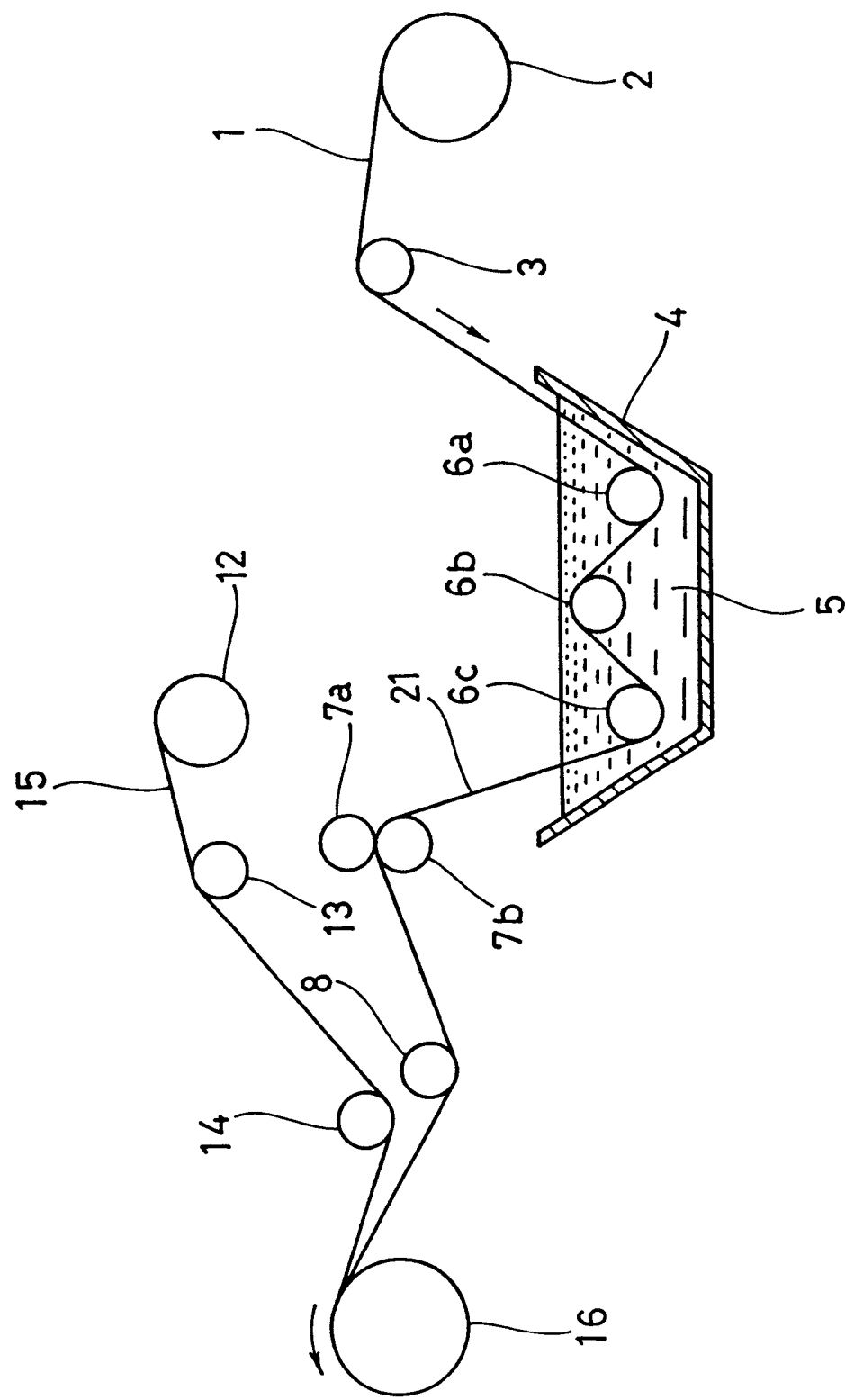
FIG. 9 is a typical view illustrating a manufacturing apparatus according to a fourth embodiment of the present invention.

FIG. 9 is a typical view illustrating a manufacturing apparatus according to a fourth embodiment of the present invention. Referring to FIG. 9, according to this embodiment, a metallic roll 16 is used as a supporter as in the case of Embodiment 3, and aromatic polyamide fiber 15 is wound, arranged on an impregnated non-woven tape 21.

The same non-woven tape as the one used in the case of Embodiment 3 is used. The same polyurethane elastomer as the one used in Embodiment 1 is used. The same bundle of filaments of aromatic polyamide fiber as the one used in Embodiment 2 is used as reinforcing yarn.

The feed pitch of winding is 10 mm, and five pieces of reinforcing yarn are arranged parallel with each other with spacing of 2 mm in a part of 10 mm from the end of the non-woven tape as in the case of Embodiment 2.

After curing the polyurethane elastomer, its surface is cut and ground.

Figure 10:
FIG. 10 is a cross sectional view illustrating a belt according to the fourth embodiment of the present invention.

FIG. 10 is a cross sectional view of an endless belt obtained according to this embodiment. Referring to FIG. 10, reinforcing yarn 15 is arranged inside in a radial direction of the endless belt 35 adjacent to the edge of the belt. The reinforcing yarn 15 extends at an obtuse angle from the inner edge of the endless belt. The thickness of the obtained endless belt is about 2.6 mm.

Reference Example 1

A polyurethane elastomer material liquid is coated and cured from one surface of endless base fabric by the casting method. At this time, the material liquid is prevented from oozing out to the other surface. The side of the polyurethane surface is cut and ground to form an endless press for a dewatering press of a single coat type having a thickness of 2.6 mm.

Reference Example 2

A polyurethane elastomer material liquid is coated and cured on both of the front and rear surfaces of endless base fabric by the casting method to form an endless belt. The side of the front surface is cut and ground, and then grooves are formed with a rotary cutter to form an endless belt for a dewatering press having a thickness of 5.5 mm.

A specimen having a width 20 mm and a length of 150 mm is taken from each of the endless belts for dewatering presses according to the above Embodiments 1–4, and Reference Examples 1 and 2, and the tensile strength and elongation of them were measured similarly to JISK 6301.

Table 1 shows a tensile strength (kg/cm) in a traveling direction, i.e, a circumferential direction.

TABLE 1

|  | Elongation | |
| --- | --- | --- |
|  | 1% | 5% |
| Embodiment 1 | 5.1 | 18.7 |
| Embodiment 2 | 53.1 | 89.0 |
| Embodiment 3 | 13.2 | 52.4 |
| Embodiment 4 | 53.1 | 74.1 |
| Reference Example 1 | 10.6 | 38.3 |
| Reference Example 2 | 19.6 | 63.5 |

Table 2 shows the tensile strength (kg/cm) in the width direction.

TABLE 2

|  | Elongation | |
| --- | --- | --- |
|  | 1% | 5% |
| Embodiment 1 | 2.9 | 11.5 |
| Embodiment 2 | 11.0 | 41.0 |
| Embodiment 3 | 11.5 | 42.7 |
| Embodiment 4 | 7.3 | 23.6 |
| Reference Example 1 | 4.1 | 14.8 |
| Reference Example 2 | 6.0 | 25.5 |

As shown in Tables 1 and 2, the endless belts according to the Embodiments 1–4 of the present invention have strength enough for use, and the ones reinforced with reinforcing yarn have strength approximately equal to or larger than that of the endless belts of the conventional reference examples 1 and 2.

While deformation of a belt, generation of wrinkles in the belt and meandering of the belt are recognized in the endless belts according to Reference Examples 1 and 2, such deformation or meandering are not recognized in the endless belts according to Embodiments 1–4 of the present invention. In addition, in the endless belts according to Embodiments 1–4 of the present invention, the fibrous material is dispersed uniformly in the whole, and no bubbles are recognized in the elastic body layer.

Embodiment 5

Figure 11:
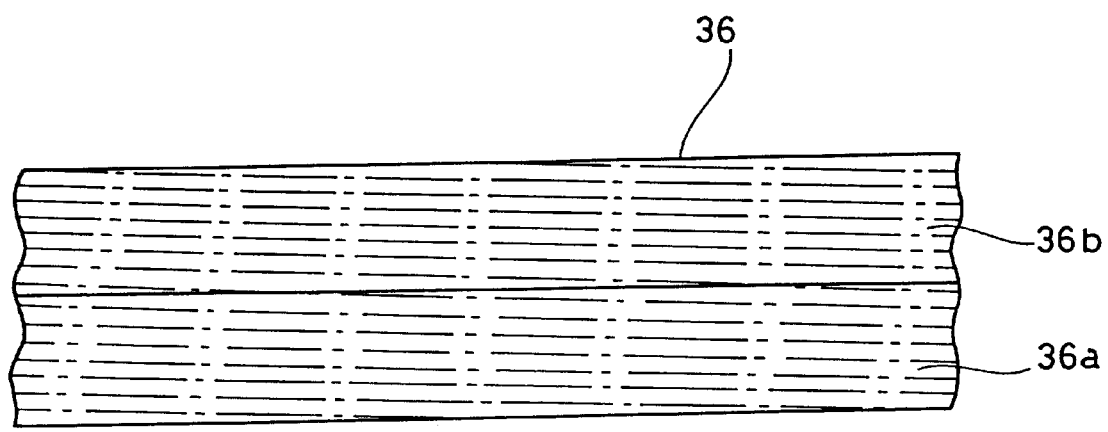
FIG. 11 is a cross sectional view illustrating a belt according to a fifth embodiment of the present invention.
Figure 12:
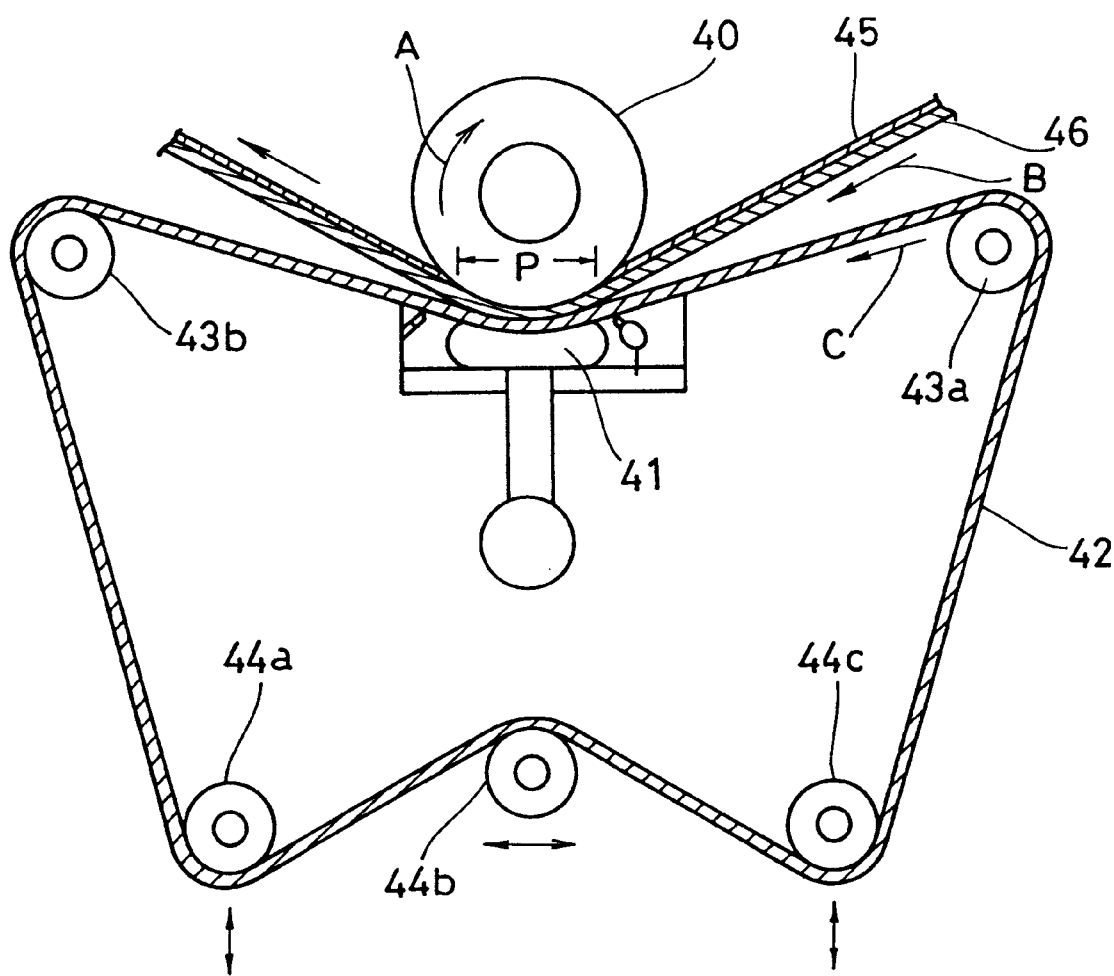
FIG. 12 is a typical cross sectional view illustrating Extended Nip Press apparatus.
Figure 13:
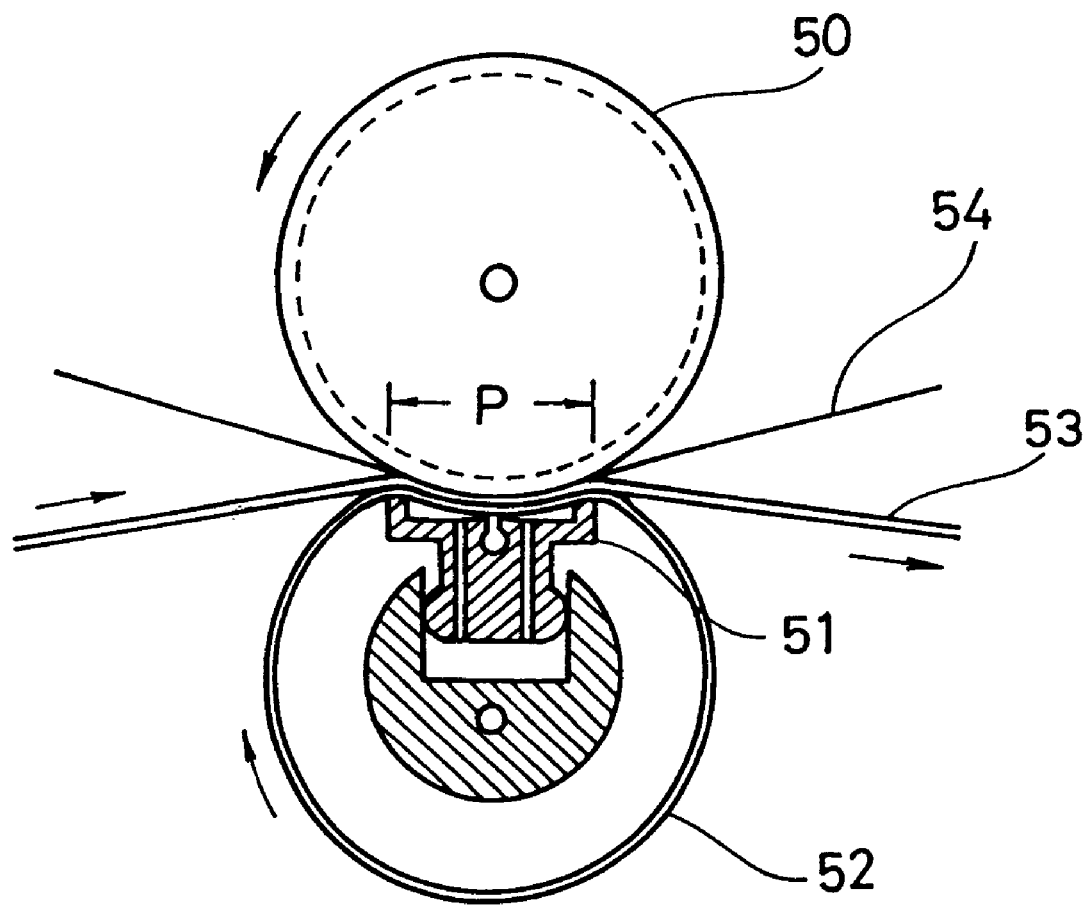
FIG. 13 is a typical cross sectional view illustrating Intensa S Press apparatus.

FIG. 11 is a cross sectional view illustrating a belt according to a fifth embodiment of the present invention. Referring to FIG. 11, the endless belt 36 is formed of two elastic body layers 36a and 36b. Elastic body layer 36b is formed by further winding an impregnated non-woven tape after the winding for forming elastic body layer 36a is once completed. Accordingly, it is possible to use different types of the fibrous material and/or the elastic body precursor to be impregnated in elastic body layer 36a and elastic body layer 36b. By using such a method, wherein the layer 36a and 36b form the inner and outer edges of the endless belt 36 it is possible to form an endless belt in which the hardness of an inside part is different from the hardness in the outside part, for example. For example, it is possible to make the hardness on the side of an outer peripheral surface be Shore hardness A95° and make the hardness on the side of an inner peripheral surface be Shore hardness A90° and so forth.

Embodiment 6

Figure 14:
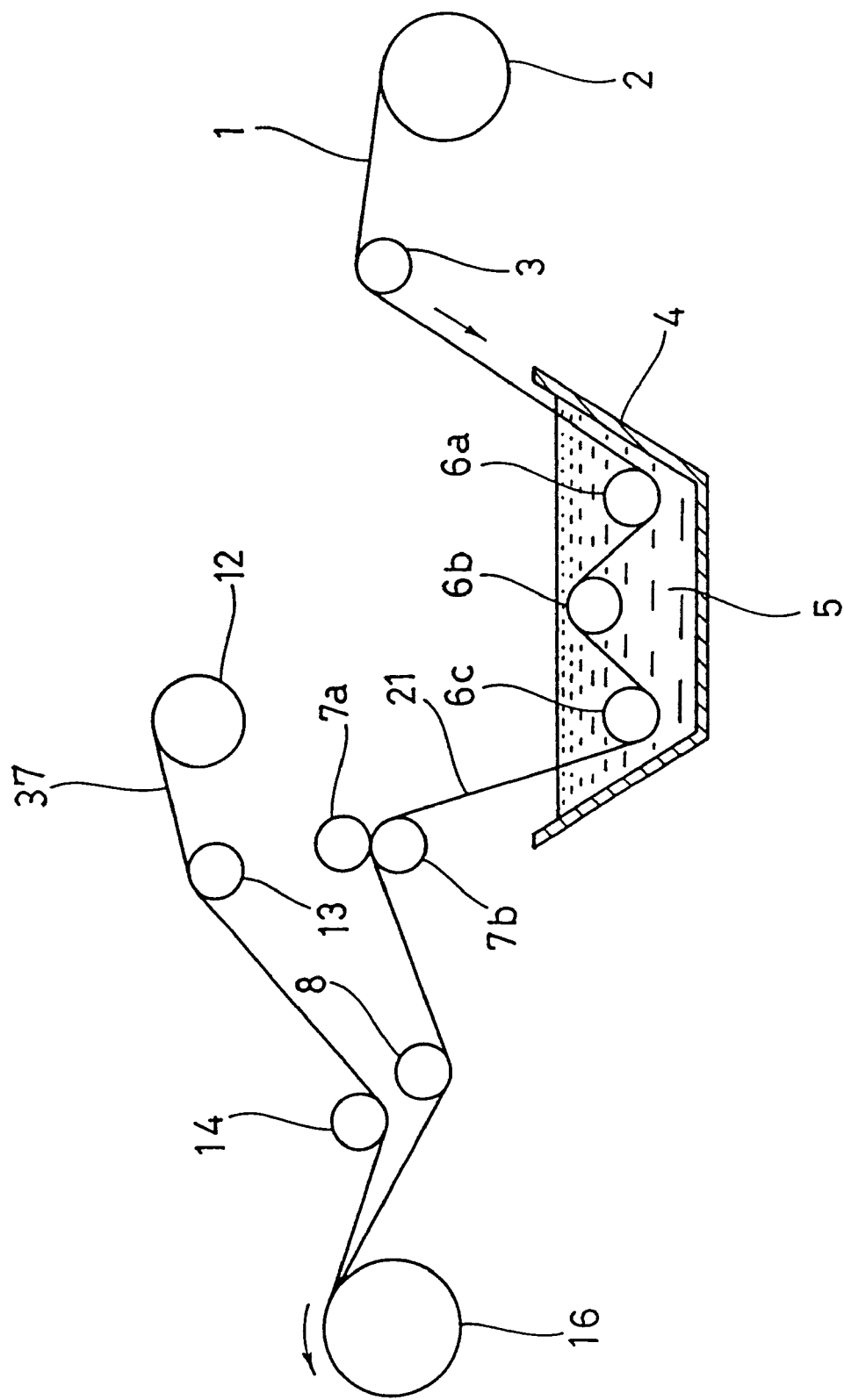
FIG. 14 is a schematic view illustrating a manufacturing apparatus according to a sixth embodiment of the present invention.

FIG. 14 is a schematic view illustrating a manufacturing apparatus according to a sixth embodiment of the present invention. Referring to FIG. 14, according to this embodiment, a metallic roll 16 is used as a supporter as in the case of Embodiment 4, and a reinforcing net-like material body 37 formed of polyamide fiber is wound, arranged on an impregnated non-woven tape 21.

Figure 15:
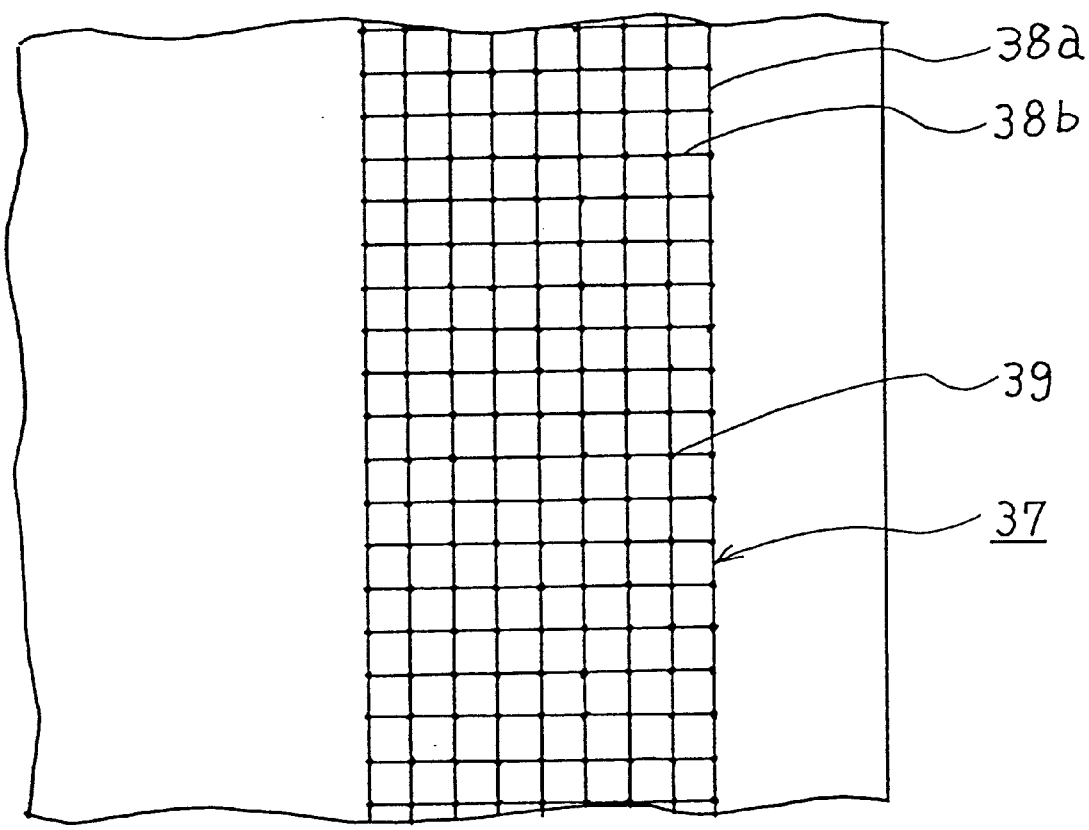
FIG. 15 is a plan view illustrating a reinforcing net-like material body on a non-woven tape in the embodiment illustrated in FIG. 14.

The same non-woven tape as the one used in Embodiment 1 is used. Also the same polyurethane elastomer as the one used in Embodiment 1 is used. As illustrated in FIG. 15, yarn formed of polyamide fiber is used as longitudinal linear material bodies 38a and lateral linear material bodies 38b of reinforcing net-like material body 37, and the crossings 39 are fixed temporarily with an adhesive.

The feed pitch of impregnated non-woven fabric 21 is 20 mm. As illustrated in FIG. 15, reinforcing net-like material body 37 is arranged in a part of 20 mm from the end of impregnated non-woven tape 21. The width of reinforcing net-like body 37 is 40 mm.

After curing the polyurethane elastomer, its surface is cut and ground.

Figure 16:
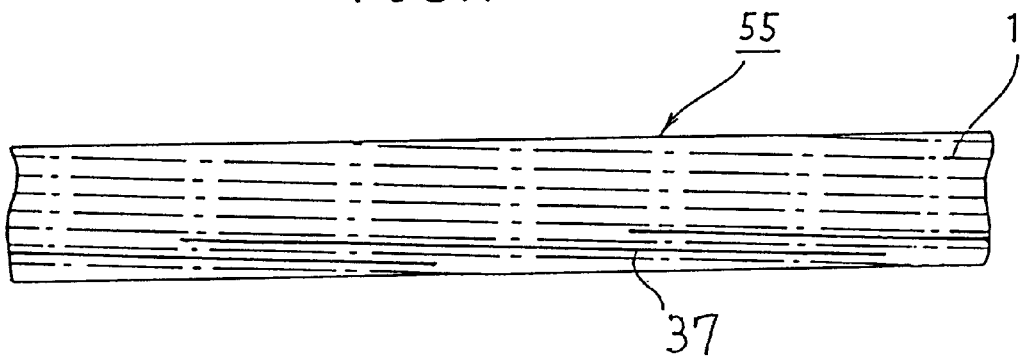
FIG. 16 is a cross sectional view illustrating a belt according to the sixth embodiment of the present invention.

FIG. 16 is a cross-sectional view of an endless belt 55 obtained according to this embodiment. As illustrated in FIG. 16, reinforcing net-like body 37 is arranged in a layer of endless belt 55. The reinforcing net-like body 37 extends at an obtuse angle from the inner edge of the endless belt 55. The thickness of the obtained endless belt is about 2.6 mm.

Embodiment 7

Figure 17:
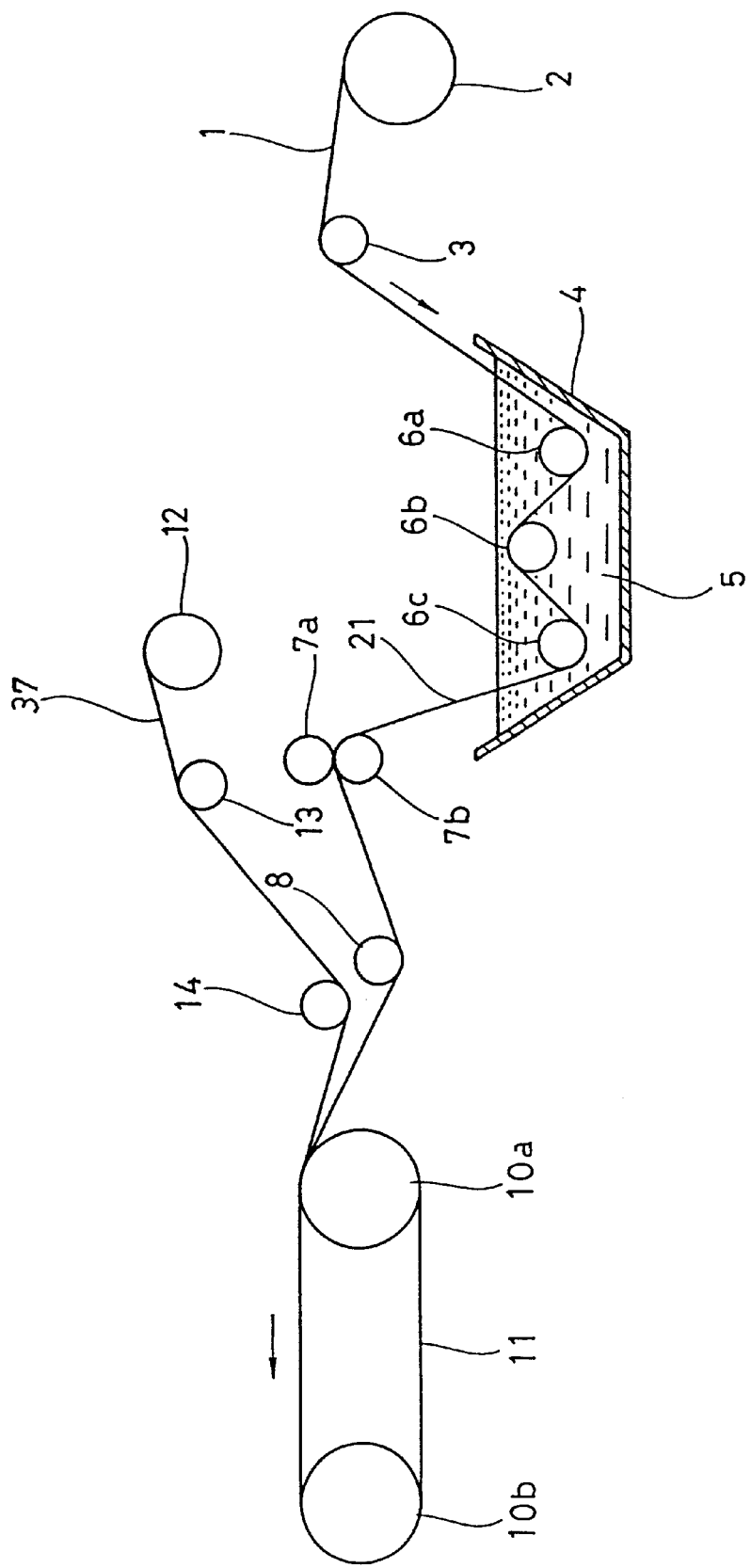
FIG. 17 is a schematic view illustrating a manufacturing apparatus according to a seventh embodiment of the present invention.

FIG. 17 is a schematic view illustrating a manufacturing apparatus according to a seventh embodiment of the present invention. Referring to FIG. 17, according to this embodiment, a supporting belt 11 attached to outer peripheral surfaces of metallic rolls 10a and 10b is used as a supporter as in Embodiment 2, and the same reinforcing net-like material body 37 as the one used in Embodiment 6 is wound, arranged on impregnated non-woven tape 21.

The same non-woven tape as the one used in Embodiment 1 is used. Also the same polyurethane elastomer as the one used in Embodiment 1 is used.

The feed pitch of an impregnated non-woven fabric is 10 mm. Reinforcing net-like material body 37 is arranged in a part of 20 mm from the end of impregnated non-woven tape 21 as in the case of Embodiment 6. The width of reinforcing net-like material body 37 is the same as that in Embodiment 6.

Figure 18:
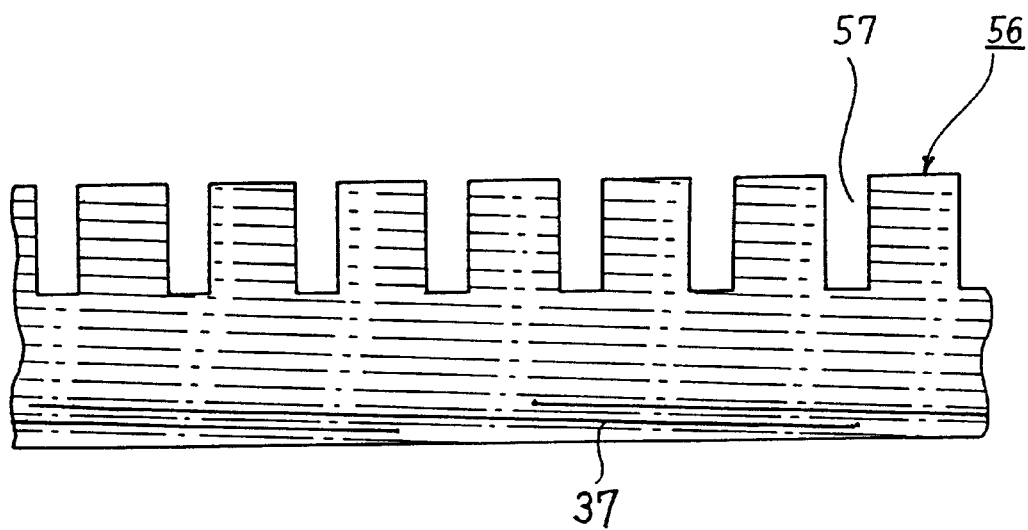
FIG. 18 is a cross sectional view illustrating a belt according to the seventh embodiment of the present invention.

After the impregnated non-woven fabric and the reinforcing net-like material body are wound on the whole supporting belt 11, the polyurethane elastomer is cured, and its surface is cut and ground. Then, grooves along a circumferential direction are formed on its surface using a rotary cutter. The thickness of the obtained endless belt is about 5.5 mm, and its section is as illustrated in FIG. 18. Referring to FIG. 18, grooves 57 along the circumferential direction are formed on an outer peripheral surface of an endless belt 56 according to this embodiment. Reinforcing net-like material body 37 is arranged in the elastic body layer as illustrated in FIG. 18. The reinforcing net-like material 37 extends at an obtuse angle from the inner edge of the endless belt.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An endless belt for use in a dewatering press to remove water from a wet web which comprises an endless elastic body layer, a fibrous material substantially, uniformly disposed throughout said endless elastic body layer and a reinforcing yarn further disposed within said elastic body layer, the belt having an inner and outer edge with respect to a radial direction and the yarn being arranged inside in the radial direction of said elastic body layer and at least a portion of the yarn being adjacent to the inner edge of the belt.

2. The endless belt for a dewatering press according to claim 1, wherein said endless elastic body layer is formed by curing a liquid elastic body precursor impregnated into said fibrous material.

3. The endless belt according to claim 1, wherein said elastic body layer has a cylindrical shape.

4. The endless belt for a dewatering press according to claim 2, wherein said fibrous material is a non-woven tape.

5. The endless belt for a dewatering press according to claim 4, wherein said non-woven tape impregnated with said elastic body precursor is wound and layered in an endless peripheral surface, and said impregnated elastic body precursor is cured to integrate said layered non-woven tape.

6. The endless belt according to claim 5, wherein said endless peripheral surface has a cylindrical shape.

7. The endless belt for a dewatering press according to claim 4, wherein said non-woven tape includes organic fiber.

8. The endless belt for a dewatering press according to claim 7, wherein said organic fiber includes at least one selected from the group consisting of polyamide fiber, aromatic polyamide fiber, polyester fiber, polyacrylonitrile fiber, polyvinyl alcohol fiber, polyethylene fiber, polypropylene fiber, polyvinyl chloride fiber, polystyrene fiber, polyfluoroethylene fiber, polyurethane fiber, regenerated cellulose fiber, and cotton fiber.

9. The endless belt for a dewatering press according to claim 4, wherein said non-woven tape includes inorganic fiber.

10. The endless belt for a dewatering press according to claim 9, wherein said inorganic fiber includes at least one selected from the group consisting of glass fiber, metallic fiber, and rock fiber.

11. The endless belt for a dewatering press according to claim 4, wherein said non-woven tape is formed of mixed fiber of organic fiber and inorganic fiber.

12. The endless belt for a dewatering press according to claim 1, wherein a plurality of grooves are formed on an outer peripheral surface of said elastic body layer in a machine direction.

13. The endless belt for a dewatering press according to claim 1, wherein said reinforcing yarn bodies are members selected from the group consisting of organic fiber, inorganic fiber, and mixtures thereof.

14. The endless belt for a dewatering press according to claim 1, wherein said reinforcing yarn bodies are disposed in a machine direction.

15. The endless belt for a dewatering press according to claim 1, wherein said elastic body layer includes at least member selected from the group consisting of polyurethane elastomer, acrylonitrile-butadiene copolymer, epichlorohydrin rubber, liquid rubber, thermoplastic elastomer, latex, and emulsion.

16. The endless belt for a dewatering press according to claim 1, wherein the hardness of said elastic body layer disposed in the outer radial direction of the belt is different from the hardness of said elastic body layer disposed in the inner radial direction of the belt.

17. The endless belt for a dewatering press according to claim 16, wherein the hardness of said elastic body layer disposed in the outer radial direction of the belt is higher than the hardness of said elastic body layer disposed in the inner radial direction of the belt.

18. The endless belt for a dewatering press according to claim 1, wherein a plurality of grooves are formed on an outer peripheral surface of said elastic body layer in a machine direction.

19. An endless belt for use in a dewatering press to remove water from a wet web which comprises an endless elastic body layer, a fibrous material substantially, uniformly disposed throughout said endless elastic body layer and a reinforcing material body having a net arrangement further disposed within said elastic body layer, the belt having an inner and outer edge with respect to a radial direction and the reinforcing material body being arranged inside in the radial direction of said elastic body layer and at least a portion of the reinforcing material body being adjacent to with the inner edge of the belt.

20. The endless belt for a dewatering press according to claim 19, wherein said reinforcing net arrangement is selected from the group consisting of organic material, inorganic material, and mixtures thereof.

21. The endless belt of claim 19, wherein the fibrous material is a non-woven tape.

22. The endless belt of claim 19, wherein a plurality of grooves are formed in an outer peripheral surface of said elastic body layer in a machine direction.

23. The endless belt for a dewatering press according to claim 19, wherein the hardness of said elastic body layer disposed in the outer radial direction of the belt is different from the hardness of said elastic body layer disposed in the inner radial direction of the belt.

24. The endless belt for a dewatering press according to claim 23, wherein the hardness of said elastic body layer disposed in the outer radial direction of the belt is higher than the hardness of said elastic body layer disposed in the inner radial direction of the belt.

25. The endless belt for a dewatering press according to claim 19, wherein the reinforcing material body extends at an obtuse angle from the inner edge of the endless belt.

26. An endless belt for use in a dewatering press to remove water from a wet web which comprises a fibrous material which has been impregnated with an elastic material whereby the fibrous material is uniformly distributed throughout the elastic material, wherein the hardness of the impregnated fibrous material in an outer radial direction of the belt is different from the hardness of the impregnated fibrous material in an inner radial direction of the belt, the elastic material consisting of two elastic body precursors which are in engagement and which form inner and outer edges of the belt in a radial direction.

27. The endless belt of claim 26, wherein the hardness of the impregnated fibrous material in the outer radial direction of the belt is higher than the hardness of the impregnated fibrous material in the inner radial direction of the belt.

28. The endless belt of claim 26, wherein a plurality of grooves are formed in a machine direction in an outer peripheral surface of said impregnated fibrous material.

29. The endless belt of claim 26, wherein said impregnated fibrous material further contains reinforcing yarn bodies.

* * * * *